United States Patent
Wolf

(10) Patent No.: US 9,327,778 B2
(45) Date of Patent: May 3, 2016

(54) MOTOR VEHICLE WITH A DEVICE FOR REDUCING AN AIR STREAM FLOW INTO A WHEEL HOUSE

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/457,450

(22) Filed: Aug. 12, 2014

(65) Prior Publication Data

US 2015/0048648 A1 Feb. 19, 2015

(30) Foreign Application Priority Data

Aug. 13, 2013 (DE) .......................... 10 2013 108 762

(51) Int. Cl.
*B62D 35/02* (2006.01)
*B62D 25/16* (2006.01)

(52) U.S. Cl.
CPC ................ *B62D 35/02* (2013.01); *B62D 25/16* (2013.01)

(58) Field of Classification Search
CPC ...... B62D 35/02; B62D 25/16; B62D 35/007; B62D 35/001
See application file for complete search history.

(56) References Cited

U.S. PATENT DOCUMENTS

| 7,380,869 B2 | 6/2008 | Nakaya |
| 7,845,709 B2 | 12/2010 | Browne et al. |
| 2011/0309652 A1 | 12/2011 | Eichentopf et al. |
| 2012/0013113 A1 | 1/2012 | Trenne et al. |

FOREIGN PATENT DOCUMENTS

| DE | 10 2006 002 769 A | 8/2007 | | |
| DE | 10 2010 018 779 A | 11/2010 | | |
| DE | 102010018779 A1 * | 11/2010 | ............. | B60G 7/001 |
| FR | 2961468 A1 * | 12/2011 | ............. | B62D 35/02 |

* cited by examiner

*Primary Examiner* — Glenn Dayoan
*Assistant Examiner* — Melissa A Black
(74) *Attorney, Agent, or Firm* — Gerald E. Hespos; Michael J. Porco; Matthew T. Hespos

(57) ABSTRACT

A motor vehicle (1) has a device (5) that projects into the wheel house (3) to reduce the flow of air into the wheel house (3) while the motor vehicle (1) is moving. The device (5) may extend from an underbody panel (4) of the motor vehicle (1) and may be pivotable about a longitudinal axis (6) of the motor vehicle (1) on a side of the underbody panel (4) that faces the wheel house (3). Alternatively, the device (5) is connected to a chassis component (7) of a wheel (2) arranged within the wheel house (3).

16 Claims, 3 Drawing Sheets

US 9,327,778 B2

MOTOR VEHICLE WITH A DEVICE FOR REDUCING AN AIR STREAM FLOW INTO A WHEEL HOUSE

CROSS REFERENCE TO RELATED APPLICATION

This application claims priority under 35 USC 119 to German Patent Appl. No. 10 2013 108 762.0 filed on Aug. 13, 2013, the entire disclosure of which is incorporated herein by reference.

BACKGROUND OF THE INVENTION

1. Field of the Invention

The invention relates to a motor vehicle with a wheel house and a pivotable device that projects into the wheel house to reduce the flow of air into the wheel house while the motor vehicle is moving.

2. Description of the Related Art

Air flows into the wheel house of a vehicle while the vehicle is moving, and therefore the air flowing around the vehicle is disturbed in the region of this region of the motor vehicle. Different solutions have been disclosed for reducing the flow of air into the wheel house while a motor vehicle is moving.

U.S. Pat. No. 7,845,709 discloses a plate-like device that is pivotable about a vertical axis for reducing the flow of air into the wheel house while the motor vehicle is moving. A force generator can transfer the plate-like device between a non-effective position and an operative position. The device is oriented parallel to the axis of rotation of the wheel and bears against the wheel house in the non-effective position. However, the device is pivoted out by approximately 90° in the operative position and substantially spans the distance from the wheel house to the radially outer circumference of the wheel, said circumference facing the outside of the vehicle. Thus, air cannot flow from the side of the vehicle into the wheel house while the vehicle is moving.

U.S. Pat. No. 7,380,869 discloses a motor vehicle with a device for reducing the flow of air into the wheel house while the motor vehicle is moving. In this connection, a partial region of the wheel house that faces the front of the motor vehicle is connected pivotably to the remaining region of the wheel house. This pivotable region of the wheel house can be moved closer to the wheel by an adjustment mechanism. The flow cross section for the air into the region between wheel house and wheel can thereby be reduced. The pivot axis of the device is parallel to the axis of rotation of the wheel.

The measures mentioned for reducing the flow of air into the wheel house of a motor vehicle improve the aerodynamics of the motor vehicle in the region of the wheel house and improve the aerodynamic drag of the motor vehicle. As a result, fuel consumption for the motor vehicle is reduced.

It is an object of the invention to develop a motor vehicle with a structurally simple mechanism that reduces the flow of air from below into the wheel house while the motor vehicle is moving.

SUMMARY OF THE INVENTION

The invention relates to a device that is connected to a part of an underbody panel of a motor vehicle at a side of the underbody panel facing the wheel house. The device is pivotable about an axis that is parallel to a longitudinal axis of the motor vehicle. As a result, the device reduces the flow cross section of the air into the wheel house in the region of the lower side of the wheel house while the vehicle is moving. Only a significantly reduced volumetric flow of air can therefore flow into the wheel house from below. Covering part of the wheel house from below improves aerodynamics of the motor vehicle. Air coming from the underbody can flow up into the wheel house only with a significantly reduced volumetric flow. Thus, a significantly lower aerodynamic drag of the motor vehicle and a lower lift of the motor vehicle in the region of the vehicle axle assigned to the wheel house are produced in comparison to a free flow possibility from below into the wheel house without the device.

The pivot axis is a longitudinal axis of the motor vehicle. Thus, the device of the invention can pivot during compression and rebound of the wheel in the wheel house and is not damaged by a chassis component that receives the wheel.

The device preferably is formed by an enlargement of the underbody panel into the wheel house. This design permits a structurally simple formation of the arrangement of underbody panel and device. The underbody panel can thus be enlarged only by the region taken up by the device.

The device and the underbody panel can be connected pivotably in a very wide variety of ways. The connection may take place by a joint, a bending edge or a fold. In particular, the device and the underbody panel form a component that has the pivotable connection of device and underbody panel.

The device can be plate-like and hence can be produced in a particularly simple manner, for example by shaping a plastics part. The device and the underbody panel may be produced in a common production process.

The device may be pivotable as a function of a compression and rebound of a wheel arranged within the wheel house. In particular, the device may be connected to a compressing and rebounding chassis component that receives the wheel. Compression and rebound of the chassis component therefore results in the device also compressing and rebounding.

If the wheel that is received by the wheel house is a steerable wheel, the device may cover the wheel house from below to a smaller extent than in the case of a non-steerable wheel. A wheel house that receives a non-steerable wheel may have a rectangular device that is connected pivotably to the underbody panel in the region of a long rectangle side. In contrast, the device may be trapezoidal if the wheel house receives a steerable wheel. The device is connected pivotably to the underbody panel in the region of the longer of the two parallel sides of the trapezoid. The arrangement of device and underbody panel may be selected so that a lower surface of the device and a lower surface of the underbody panel are coplanar in the compressed position of the wheel. However, the device is inclined obliquely down from the underbody panel to the side of the motor vehicle in the rebounded position of the wheel.

The invention effectively enlarges an underbody panel of a motor vehicle in the direction of the wheel house. This enlargement of the underbody panel is achieved by the device and reduces the flow of air into the wheel house while the vehicle is moving, and improves the aerodynamics of the motor vehicle. The device of the underbody panel that projects into the wheel house may be pivotable about the longitudinal axis as a function of the compression and rebound of the wheel, thereby achieving as large a covering of the wheel house as possible outside the pivoting range of a steered wheel of the motor vehicle.

The device covers the wheel house as far as possible from below while ensuring that a wheel steering angle is possible. Accordingly, the customarily steerable front axle of the motor vehicle may have trapezoidal devices assigned to the front wheel houses. Rectangular devices can be provided in the region of the customarily non-steerable rear axle of the motor vehicle. The wheel would collide with the device during rebounding of the wheel. Thus, the device is connected to the underbody panel for pivoting about the longitudinal axis of the motor vehicle. For example, whenever the motor vehicle is raised and not standing on the wheels, a collision of the device with chassis struts supporting the wheel is prevented. The pivotable mounting of the device enables the device to follow the compression and rebound movement of the chassis component. Thus, a maximum covering of the device in the wheel house and therefore a maximum aerodynamic effect can be achieved. If the wheel is not steerable, a wheel steering angle does not have to be taken into consideration and it is optionally possible only for a partial region of the rectangular device to be arranged pivotably.

In accordance with a second variant, the device may be pivotable about a longitudinal axis of the motor vehicle adjacent to a side of the underbody panel of the motor vehicle that faces the wheel house. More particularly, the device may be connected to a chassis component of a wheel that is arranged pivotally within the wheel house. This chassis component may be a chassis link.

A device that is used with a steerable wheel may be trapezoidal and may have the longer of the two parallel sides of the trapezoid arranged adjacent to the underbody panel.

A device that is used with a non-steerable wheel may be rectangular and may have one of the long rectangle sides arranged adjacent to the underbody panel.

The device may be positioned so that in the compressed position of the wheel, a lower surface of the device forms a plane with the lower surface of the underbody panel. In the simplest design, the device is of plate-like design.

To avoid repetitions with respect to the second variant, reference is made to the same explanations above for the first variant. The explanations relating to the device in general, and therefore not to the special connection of device and underbody panel according to the first variant.

Further features of the invention emerge from the description of the preferred exemplary embodiment reproduced in the drawing, without being limited to the exemplary embodiment.

DETAILED DESCRIPTION

The space coordinates X, Y and Z are illustrated in each of the figures. The coordinate X constitutes the longitudinal direction of a vehicle, the coordinate Y constitutes the transverse direction of the vehicle and the coordinate Z constitutes the vertical direction of the vehicle. The coordinate X therefore points in forward direction of travel of the vehicle during straight-ahead travel and the coordinate Y points to the sides of the vehicle.

Figure 1:
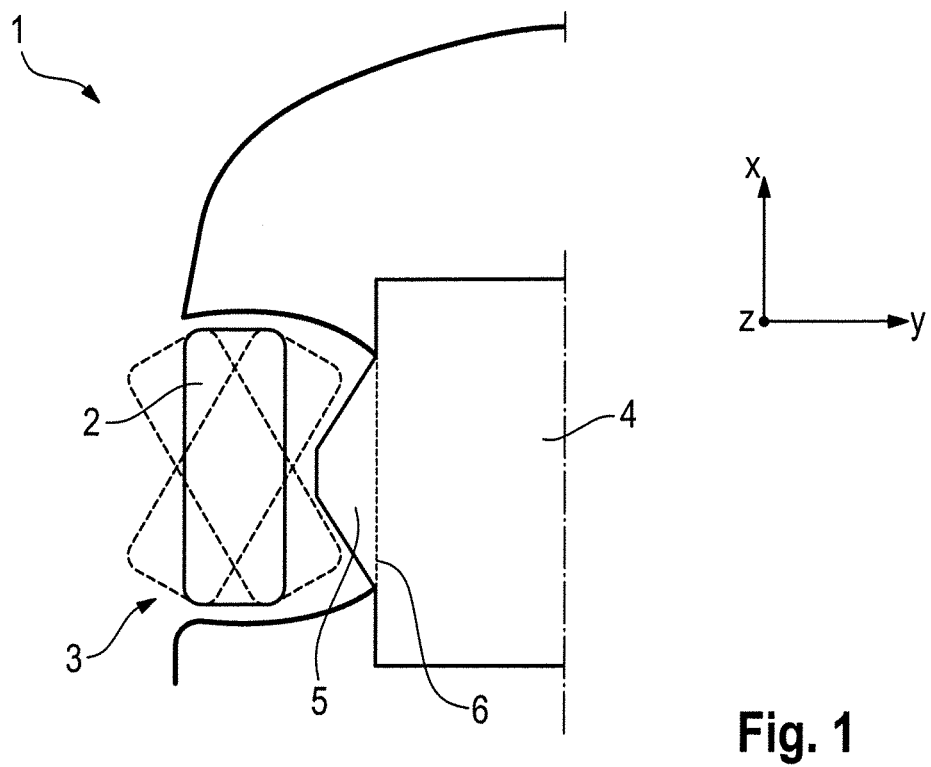
FIG. 1 shows a first variant of a motor vehicle in the region of a wheel house that receives a steerable wheel, with an underbody panel assigned to the wheel house and with a device mounted pivotably to the underbody panel, as seen in the Z direction.

FIG. 1 is a bottom plan view of an area of a motor vehicle 1 in an area of the right front wheel 2 and schematically illustrates a first variant of the invention. The motor vehicle 1 may be a passenger vehicle, and the solid line depiction of the wheel 2 is for straight-ahead travel of the motor vehicle 1. The dashed illustrations of the wheel illustrate the maximum steering angle positions for travelling around a right or left bend.

The motor vehicle 1 has a wheel house 3 for receiving the wheel 2. An underbody panel 4 is provided on the lower side of the motor vehicle 1 in the region of the front axle and the wheel 2. The underbody panel 4 is of plate-like design and extends between the wheel house 3 on the right side of the motor vehicle 1 and the wheel house for the left front wheel of the motor vehicle 1. The side of the underbody panel 4 facing the respective wheel house 3 has a device 5 for reducing the flow of air into the wheel house 3 while the motor vehicle 1 is moving. The device 5 is mounted pivotably about the longitudinal axis X of the motor vehicle 1 in the underbody panel 4. Said pivot axis is denoted by the reference number 6.

The device 5 is of plate-like design and constitutes an enlargement of the underbody panel 4 into the wheel house 3. A region of the lower surface of the device 5 forms a plane with the lower side of the underbody panel, with regard to the compressed position of the wheel. The device 5 and the underbody panel 4 therefore may be manufactured in the same production process. The articulated connection of device 5 and underbody panel 4 is designed, for example, as a bending edge or fold, but a joint may connect the underbody panel 4 and the device 5.

The two steering angle positions of the wheel 2 illustrated in FIG. 1 show that that region of the wheel house 3 that can be covered from below is reduced. Accordingly, the device 5 is a substantially trapezoidal plate and the longer parallel side thereof is connected to the underbody panel 4 via the pivot axis 6.

Figure 2:
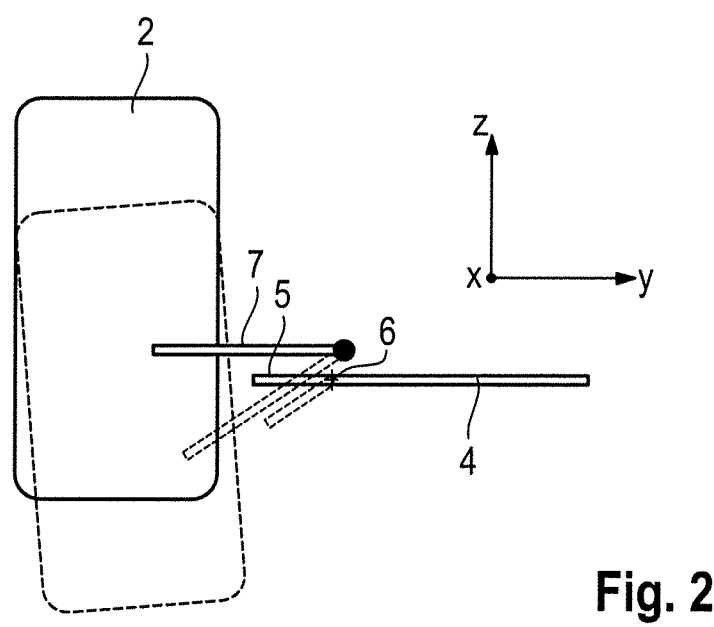
FIG. 2 shows the motor vehicle of FIG. 1 with the wheel received by the wheel house in a compressed and rebounded position, and also the arrangement of the underbody panel assigned to the wheel, and the device, as seen in the X direction.

The solid line depiction of the wheel 2 in FIG. 2 shows the compressed position of the wheel 2 and the dashed lines show the rebounded position of the wheel 2, which arises, for example, when the motor vehicle 1 is raised without the wheel 2 resting on the ground. It can be gathered from this FIG. 2 that a chassis component 7, in particular a carrier that serves for mounting the wheel 2, is oriented substantially horizontally in the Y-Z plane in the compressed position of the wheel 2 or chassis component 7. In contrast, whenever the wheel 2 and the chassis component 7 are in the rebounded state, the chassis component 7 is inclined obliquely down from the pivot axis 6. The device 5 is connected to the chassis component 7 to permit the pivoting movement of the chassis component 7 about the X axis to be undertaken with a structurally simple design of the device 5. Therefore, the angular position of the device 5 changes with the angular position changes of the chassis component 7, as is shown for the two different positions of chassis component 7 and device 5 in FIG. 2.

Figure 3:
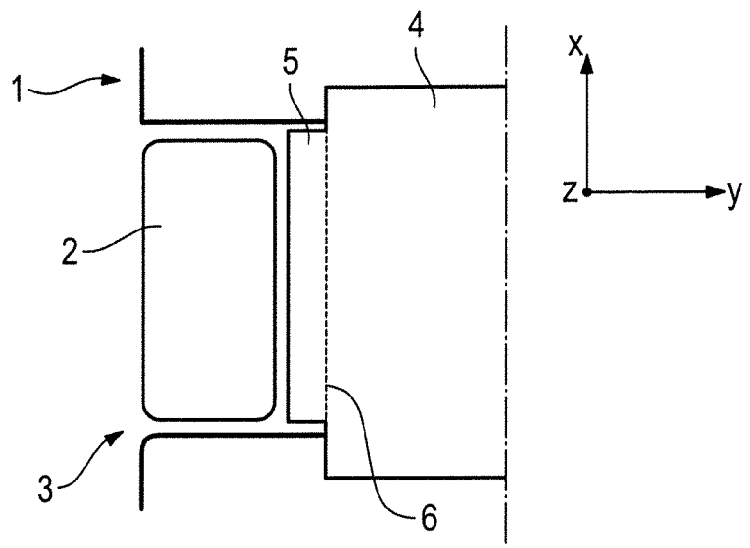
FIG. 3 the arrangement of FIG. 1, but illustrated for a non-steerable wheel, as seen in the Z direction.

The device 5 can have a modified design for a wheel 2 that is non-steerable, as shown in FIG. 3. In this case, the device 5 can cover a significantly larger area of the wheel house 3 from below by means of the device 5 to reduce the flow of air into the wheel house 3 while the motor vehicle 1 is moving. Specifically, the device 5 of FIG. 3 is substantially rectangular and is connected in the region of one of the long rectangle sides to the underbody panel 4 in the region of the pivot axis 6.

Figure 4:
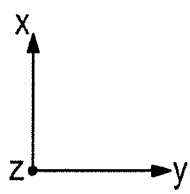
FIG. 4 shows a view in the Z direction of an underbody panel in proximity to both steerable wheels.
Figure 5:
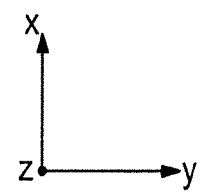
FIG. 5 shows a view in the Z direction of an underbody panel in proximity to both non-steerable wheels.

FIG. 4 illustrates the entire front part of the underbody panel 4 including the devices 5 arranged on remote sides of the underbody panel 4 and near the steerable front wheels 2, as illustrated in FIG. 1. FIG. 5 illustrates the entire rear part of the underbody panel 4 including the devices 5 arranged on remote sides of the underbody panel 4 and near the non-steerable rear wheels 2, as illustrated in FIG. 3.

Figure 6:
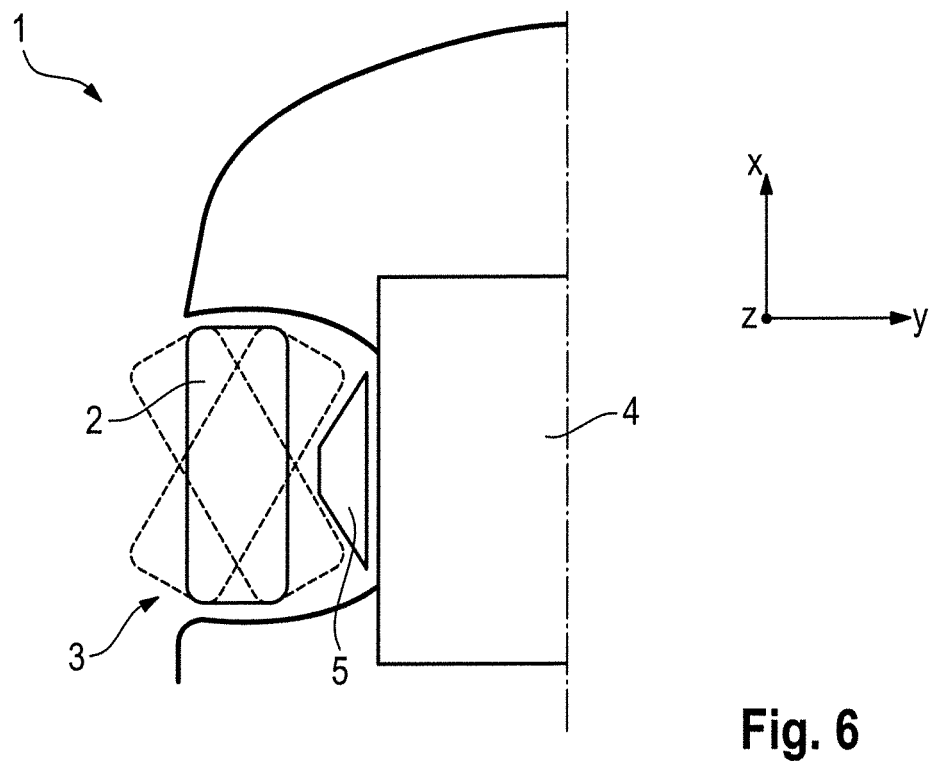
FIG. 6 is a view similar to FIG. 1, but showing a motor vehicle in the region of a wheel house for receiving a steerable wheel with a second variant of the device.
Figure 7:
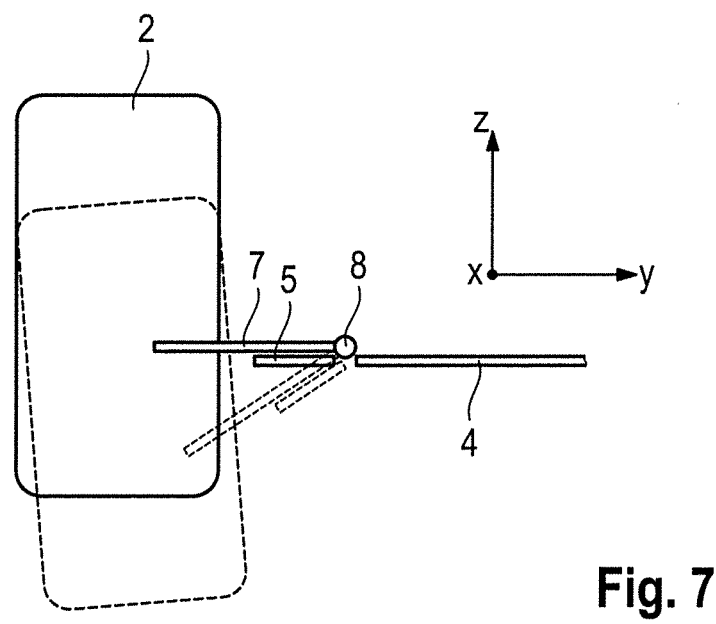
FIG. 7 is a view similar to FIG. 2, but showing the device of FIG. 6.

A second variant of the invention is illustrated in FIGS. 6 and 7 and is similar to the first variant shown in FIGS. 1 and 2. To avoid repetitions, reference is made to the basic description of FIGS. 1 and 2. Elements of the second variant that are the same as or similar to the first variant are denoted by the same reference numbers in FIGS. 1 and 2 and FIGS. 6 and 7.

The device 5 of the second variant functionally constitutes an enlargement of the underbody panel 4 and covers the wheel house 3 from below. The device 5 of the second variant is designed as a separate component in the function of an air-guiding element and is fastened to a chassis component 7 for the wheel 2. The chassis component 7 is pivotable about an axis 8 running in the X direction. The device 5 is arranged on the lower side of the compressible and reboundable chassis component 7 in the manner of the chassis link. The device 5 is a generally trapezoidal plate and the longer parallel side thereof is adjacent to the underbody panel 4. In the compressed position of the wheel 2, the lower surface of the device 5 forms a plane with the lower surface of the underbody panel 4.

LIST OF REFERENCE NUMBERS

1 Motor vehicle
2 Wheel
3 Wheel house
4 Underbody panel
5 Device
6 Pivot axis
7 Chassis component
8 Axis

What is claimed is:

1. A motor vehicle, comprising:
   a wheel house for accommodating a wheel to enable movement of the vehicle in forward and backward directions of the motor vehicle;
   an underbody panel inward from the wheel house and having a side edge adjacent the wheel house; and
   a device pivotally connected to the side edge of the underbody panel and projecting into the wheel house for reducing a flow of air into the wheel house while the motor vehicle is moving, the device being pivotable about an axis substantially parallel to the forward and backward directions of the motor vehicle.

2. The motor vehicle of claim 1, wherein the device is formed by an enlargement of the underbody panel into the wheel house.

3. The motor vehicle of claim 1, wherein the device is a plate.

4. The motor vehicle of claim 1, wherein the device is substantially rectangular and has long side connected pivotably to the underbody panel.

5. The motor vehicle of claim 1, wherein the device is substantially trapezoidal and has a long parallel side connected pivotably to the underbody panel.

6. The motor vehicle of claim 1, wherein the device and the underbody panel are connected pivotably by a joint, a bending edge or a fold.

7. The motor vehicle of claim 1, wherein a lower surface of the device and a lower surface of the underbody panel are substantially coplanar in one pivotal position of the device.

8. The motor vehicle of claim 1, wherein the device is pivotable as a function of a compression and rebound of a wheel arranged in the wheel house.

9. The motor vehicle of claim 8, wherein the device is connected to a compressible and reboundable chassis component that receives the wheel.

10. The motor vehicle of claim 8, wherein a lower surface of the device and a lower surface of the underbody panel are substantially coplanar in one pivotal position of the device in the compressed position of the wheel.

11. A motor vehicle, comprising:
    a wheel house;
    a wheel housed in the wheel house and having a chassis component, the wheel and the chassis component being arranged within the wheel house;
    an underbody panel inward from the wheel house and extending in forward and backward directions of the motor vehicle, the underbody panel having a side edge adjacent the wheel house; and
    a device fixedly connected to the chassis component of the wheel, the device pivotally connected to the side edge of the underbody panel and projecting into the wheel house for reducing a flow of air into the wheel house while the motor vehicle is moving, the device being pivotable about an axis parallel to the side edge of the underbody panel and extending in the forward and backward directions of the motor vehicle.

12. The motor vehicle of claim 11, wherein the device is a plate.

13. The motor vehicle of claim 12, wherein the device is substantially rectangular and has a long side substantially adjacent the underbody panel.

14. The motor vehicle of claim 12, wherein the device is substantially trapezoidal and has a long parallel side substantially adjacent the underbody panel.

15. The motor vehicle of claim 11, wherein a lower surface of the device is substantially coplanar with a lower surface of the underbody panel in a compressed position of the wheel.

16. The motor vehicle of claim 11, wherein the chassis component is a chassis link.

* * * * *